(12) United States Patent
Yoon et al.

(10) Patent No.: US 11,928,635 B2
(45) Date of Patent: *Mar. 12, 2024

(54) WIRELESS COMMUNICATION NETWORK AUDIO DATA PACKET LOSS DIAGNOSTICS AND VISUALIZATION SYSTEM

(71) Applicant: T-Mobile USA, Inc., Bellevue, WA (US)

(72) Inventors: Jong Sung Yoon, Sammamish, WA (US); Jie Hui, Mercer Island, WA (US); Shoeb Mohammed, Bellevue, WA (US); Maxwell Andrew Smith, Seattle, WA (US); Evgene Shulga, Bothell, WA (US); Sanjay Perumbur, Simi Valley, CA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,746

(22) Filed: Jan. 20, 2023

(65) Prior Publication Data

US 2023/0153738 A1   May 18, 2023

Related U.S. Application Data

(63) Continuation of application No. 16/567,889, filed on Sep. 11, 2019, now Pat. No. 11,562,313.

(51) Int. Cl.
*G06Q 10/0639* (2023.01)
*H04B 17/327* (2015.01)
(Continued)

(52) U.S. Cl.
CPC ..... *G06Q 10/06393* (2013.01); *H04B 17/327* (2015.01); *H04L 43/0829* (2013.01);
(Continued)

(58) Field of Classification Search
None
See application file for complete search history.

(56) References Cited

U.S. PATENT DOCUMENTS

| 2017/0272960 A1* | 9/2017 | Li ........................... H04L 43/08 |
| 2020/0067793 A1 | 2/2020 | Dribinski et al. |

(Continued)

FOREIGN PATENT DOCUMENTS

| CA | 2938389 | 8/2015 |
| EP | 3681197 | 7/2020 |

OTHER PUBLICATIONS

Office Action for U.S. Appl. No. 16/567,889, dated May 11, 2022, Yoon, "Wireless Communication Network Audio Data Packet Loss Diagnostics and Visualization System", 9 pages.

*Primary Examiner* — Walter J Divito
(74) *Attorney, Agent, or Firm* — Lee & Hayes P.C.

(57) ABSTRACT

A processor-implemented method includes receiving, from a mobile device, transmission information corresponding to an audio data transmission associated with an audio data packet loss of one or more audio data packets. The processor determines, based at least in part on the transmission information, a geographic region associated with a wireless communication network transceiver. The processor further determines an average audio data packet loss rate associated with the geographic region and a correlation between the audio data packet loss and at least one key performance indicator (KPI). The KPI is indicative of the audio data transmission. Based at least in part on (i) the average audio data packet loss rate and (ii) the correlation between the audio data packet loss and the at least one KPI, the processor generates a handover instruction comprising at least one threshold value for transitioning control from a first cell channel to a second cell channel.

20 Claims, 5 Drawing Sheets

(51) Int. Cl.
*H04L 43/0829* (2022.01)
*H04W 4/021* (2018.01)
*H04W 24/10* (2009.01)
*H04W 36/30* (2009.01)

(52) U.S. Cl.
CPC ........... *H04W 4/021* (2013.01); *H04W 24/10* (2013.01); *H04W 36/30* (2013.01)

(56) References Cited

U.S. PATENT DOCUMENTS

| | | |
|---|---|---|
| 2021/0073702 A1 | 3/2021 | Yoon et al. |
| 2021/0168476 A1 | 6/2021 | Das et al. |
| 2021/0234773 A1 | 7/2021 | Maggiore et al. |
| 2021/0289380 A1 | 9/2021 | Chae et al. |

* cited by examiner

WIRELESS COMMUNICATION NETWORK AUDIO DATA PACKET LOSS DIAGNOSTICS AND VISUALIZATION SYSTEM

CROSS-REFERENCE TO RELATED APPLICATION

This patent application is a continuation of and claims priority to U.S. patent application Ser. No. 16/567,889, filed Sep. 11, 2019, which is fully incorporated herein by reference.

BACKGROUND

Modern telecommunication systems include heterogeneous mixtures of second, third, and fourth generation (2G, 3G, and 4G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

Telecommunication systems may allocate certain bands of frequencies for transmission of signals based on predicted data traffic and availability of the communication channels. Network coverage for modern telecommunications systems is often allocated, in part, using prediction analysis and field testing. Handover settings control when and how network connections are handed from one cell channel to another cell channel, and control the frequency bands assigned for the handover. A variety of factors may be considered for the settings, such as known cell tower location, power associated with the cell tower, frequency band availability, and observations of connectivity and transmission issues. Furthermore, consideration needs to be given to the handover process in that audio quality is correlated to the handover process.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
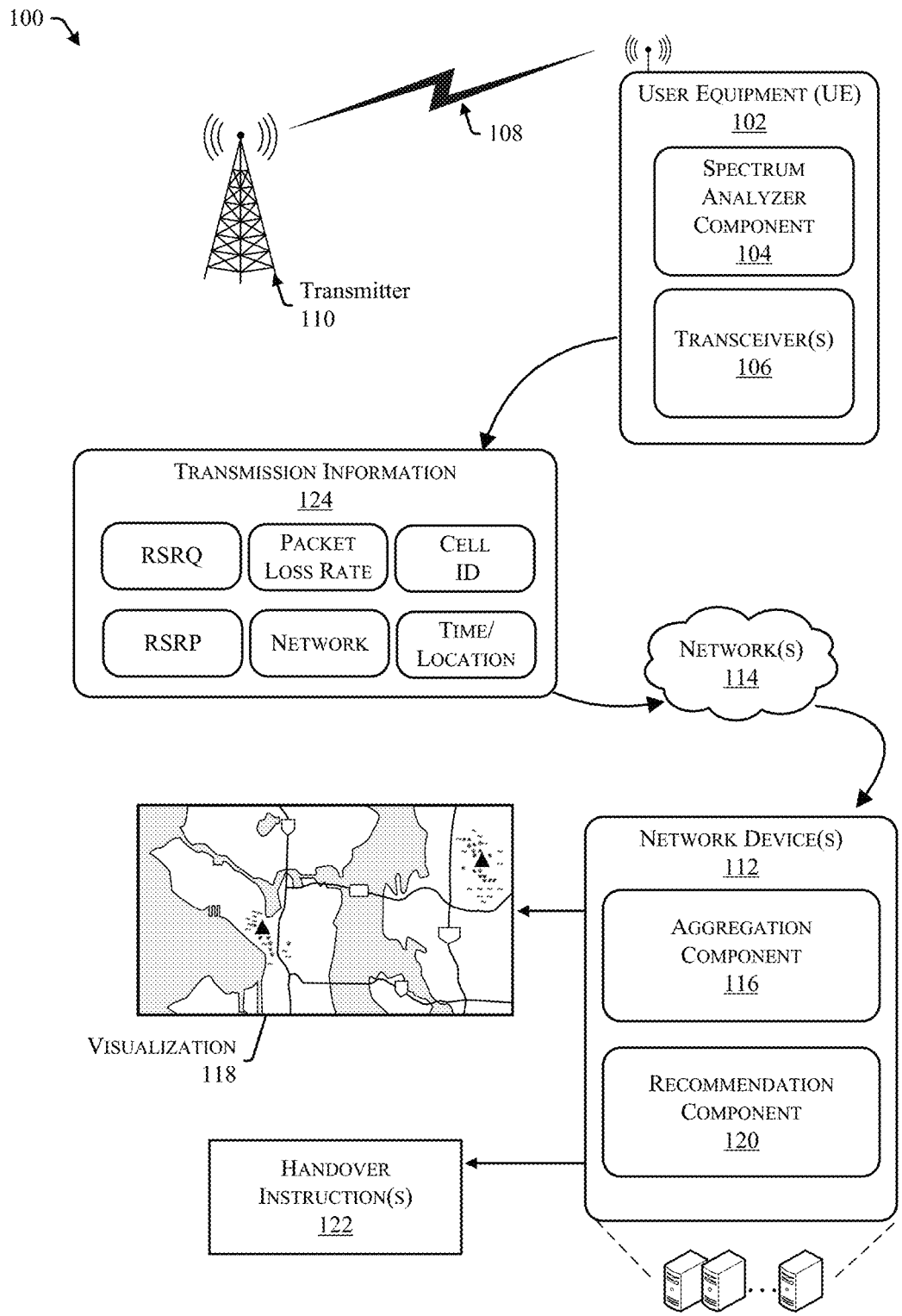
FIG. 1 illustrates an example wireless communication network including a user equipment including a spectrum analyzer to facilitate mobile collection of network metrics including audio data packet loss metrics, as described herein.

Systems, devices, and methods are directed to telecommunications systems, e.g., wireless communication networks, that include user equipment that include a spectrum analyzer to determine network metrics including audio data packet loss metrics. The wireless communication network also includes one or more network devices for analyzing such network metrics. Current network coverage analysis may be based, in part, on prediction analysis that considers a variety of factors, such as known cell tower location, power associated with the cell tower, and other factors.

In addition, some coverage analysis may include considering signal levels received by a user equipment (UE), such as mobile phones and the like. However, these received signal levels only provide data when the UE is connected to the wireless communication network. Thus, there may be geographic areas where a network device predicts good coverage, but in fact there is poor coverage, which may be undetectable because UEs are not connected to the network in those areas. For example, some large buildings, and especially those constructed of steel, may functionally result in a "faraday cage" effect that prevents UEs from connecting to the wireless communication network when the UEs are operated inside the building. However, a prediction model may predict that the particular building at that location should, in fact, have good coverage because the cell tower location(s), power associated with the cell tower(s), etc., result in good coverage in the region around the building. Accordingly, it is advantageous to identify geographic areas that are predicted to have good coverage, but in fact do not. Once geographic areas are identified to have good coverage, the network parameters may be tuned to improve audio quality during handover processes.

Aspects of the present disclosure may include collecting coverage data including signal strength information and audio data packet loss information with UEs configured with an application that may collect particular types of signal-related information, even when not connected to the wireless communication network. It has been found that audio quality is mainly affected by the audio data packet loss. In lab and field tests, it has been verified that a certain range of the audio data packet loss can be linked to a certain level of audio quality. For audio quality measurement, Mean Opinion Score (MOS) may be used. For instance, over 21% of loss rate can be mapped to the MOS score of 2 or lower. Thus, by measuring the loss rate, the audio quality MOS can be estimated.

The signal-related information may be indicative of a signal strength of a signal between a UE and a network transceiver, e.g., cell tower (base station) or other access point, in the wireless communication network. In some configurations, the signal strength information may include least one of a wireless communication network type associated with the UE or a roaming network indicator indicative of a roaming setting on the UE. Example information that may be collected with the UE (which may also be referred to herein as mobile device) may include: (1) a type of network to which the UE is connected (e.g., 5G, LTE, 3G, 2G, no network, etc.); (2) a received signal strength (e.g., reference signal received power (RSRP), etc.); (3) UE location (e.g., via a UE-based global positioning system and/or Wi-Fi positioning system); and/or (4) one or more roaming indicators such as, for example, one or more mobile country codes (MCC) and/or mobile network codes (MNC) of the roaming network.

In some configurations, the UE may be configured to collect the signal strength information and/or audio data packet loss information in response to a variety of triggers. Example triggers may include sending or receiving a voice call, an application-based trigger (e.g., launching a video-streaming application), an indication of signal loss as determined by the UE and/or by network devices, battery level thresholds, etc. The UEs may also collect the signal strength information on a periodic basis (e.g., hourly), and save the information to a local device memory.

In some configurations, an algorithm functioning as part of a spectrum analyzer or other network tool on a network device, e.g., network server, may collect coverage data as crowdsourced from multiple UEs. The server-based algorithm may compare the crowdsourced data with the predicted coverage data generated by a strength estimation model. If the strength estimation model indicates that a particular area should have good coverage, but the coverage data shows relatively weak coverage in that area, the network server may determine whether the bad coverage in the particular area affects a threshold number of subscribers and/or if the particular area is of a threshold size.

If the one or more thresholds are met, then the server-based algorithm may automatically generate a message to update hardware component(s) associated with that location. For example, the network device may recommend remedial action, such as the installation of a network cell tower in the particular area with the bad coverage. The network device may also, or alternatively, recommend a handover of one or more UEs from one cell and/or cell channel to another cell and/or cell channel based at least in part on the one or more thresholds. The network device may also generate a graphic output of a map showing relative signal strength of varying colors and opacity that indicate call density and signal strengths. In some aspects, the map may be part of the recommendation and/or used to generate the recommendation. The graphic may also be used as a visualization tool to select high-value changes to the network infrastructure.

In some configurations, the spectrum analyzer may be implemented as an application or component running on the UE configured to interact with an operating system component of the UE. The spectrum analyzer may determine, based at least in part on the signal strength information, a coverage area associated with the network transceiver. The spectrum analyzer may instruct the operating system component to control software and/or hardware associated with a transceiver of the UE to scan various channels in a frequency resource to determine metrics associated with the frequency resource. In some configurations, the frequency resource may be outside of a frequency band or range used by the UE to conduct communications. In some configurations, the one or more metrics may include, but are not limited to, audio data packet losses, audio data packet loss rates, a received signal strength indication (RSSI), a reference signal received power (RSRP) (which refers to the LTE signal strength), a reference signal received quality (RSRQ) (which refers to the LTE signal quality), a signal-to-interference-plus-noise ratio (SINR), and/or a power density for a specific bandwidth in a frequency domain. The one or more metrics may be sent to the network device for aggregation and determination of one or more sources of diminished signal strength. Example sources may include an interference level (e.g., an existing interference level, an estimated interference level, etc.), for example, to determine whether to deploy a transmitter to a location, to deploy a network engineer to tune one or more transmitters to reduce the interference, and the like.

Once coverage areas, e.g., cells and/or channels (bands) within cells, of good coverage within the wireless communication network are identified, network parameters may be "fine tuned" to improve audio quality, e.g., reduction of an audio data packet loss rate, during handover processes among cells. For example, UEs deliver the RSRP and RSRQ on all the signals detected from a cell to which the UEs are connected (connected cells) as well as neighbor cells in the measurement reports to the connected cell. The wireless communication network may make a handover decision based on the RSRP and RSRQ. According to known 3GPP technical specifications, the standard for handover includes, among other events, A1, A2 and A5 events. The A1 event is defined as the serving cell (connected cell) becomes better than a threshold. The A2 event is defined as the serving cell becomes worse than the threshold. The A5 event is defined as the serving cell becomes worse than a first threshold and a neighbor cell becomes better than a second threshold.

The 3GPP technical specification defines the types of events and the types of signal condition metrics (RSRP, RSRQ) to utilize in the handover decision process, the 3GPP technical specification does not mandate particular values for the thresholds and each field engineering team of the wireless communication network may choose to use only one of the signal metrics rather than both RSRP and RSRQ. Furthermore, different threshold values may be applied on different cells so that cells in one configuration may serve more traffic than other cells in another configuration.

Since audio quality is correlated to the handover process based on a correlation analysis between the audio quality and the network Key Performance Indicators (KPIs), in accordance with one example of the present disclosure, the following parameters for one instance of a handover process were determined:

1) A1, A2, A5 thresholds are changed on RSRP on each band (e.g., L700—LTE 700 MHz, L1900—LTE 1900 MHz, L2100—LTE 2100 MHz);

2) A1, A2, A5 thresholds are added on RSRQ. Previously RSRQ was not considered for the handover processes; and 3) A separate set of RSRP/RSRQ thresholds on the QCI1 bearer, which is the radio bearer for audio packets on voice over LTE calls.

RSRQ are affected by the traffic on channels. If there are many active UEs at the same time and location on the same band (channel), the RSRQ will become lower. Thus, in such cases traffic needs to be moved from the congested band to a different band with lower traffic. By changing A1/A2/A5 thresholds on different bands and also considering RSRQ, the handover process may happen more effectively to prevent from audio issues and the effect may be verified with the reduction in the audio loss rate, e.g., loss of audio data packets.

In one use case, the techniques discussed herein may be implemented on a UE configured to facilitate user communications using first frequency resources. In some configurations, the first frequency resources may include, but are not limited to, an LTE Band 12 (e.g., a 700 MHz Band), an LTE Band 4 (e.g., 1700 MHz band and/or a 2100 MHz band), an LTE Band 2 (e.g., a 1900 MHz band), an LTE Band 66 (e.g., a 1700 MHz band and/or a 2100 MHz extended band), a UMTS Band 4, UMTS Band 2, GSM Band 2, 5G (e.g., 3.5 GHz-6 GHz, 28 GHz, etc.) and the like. Further, a spectrum analyzer may be implemented as an application on the UE to intermittently scan second frequency resources. In some configurations, the second frequency resources may be separate from the first frequency resources. For example, the second frequency resources may include, but are not limited to, an LTE Band 71 (e.g., a 600 MHz band), an LTE Band 48 (e.g., 3400 MHz), and the like. The first frequency resource and the second frequency resource may include any range of wireless frequencies capable of being used to communicate data. Thus, in general, the techniques may include the UE using the first frequency resources for communication(s) (e.g., voice communication, data communications, etc.), and using the spectrum analyzer to scan the second frequency resources, without using the second frequency resources for communication(s). However, in some configurations, the techniques may include utilizing the second frequency resources for communication(s), while monitoring metrics associated with the resources to determine sources of interference, for example.

Further, in some configurations, the techniques described herein may include determining one or more of a power resource or a location of the UE, and initiating scanning of a frequency resource based at least in part on the power resource or the location. For example, if a battery of the UE is below a threshold value, the spectrum analyzer may be prevented from scanning a frequency resource. In another example, if a location of the UE is outside of a specific area, such as a geofenced location, the UE may be prevented from scanning the frequency resource.

In some configurations, the spectrum analyzer may initiate scanning of a frequency resource at a time in which the UE is not utilizing the frequency resource for a communication. In some configurations, the spectrum analyzer may initiate scanning of the frequency resource at a time in which the UE is utilizing the frequency resource for a communication.

The systems, devices, and techniques described herein may improve functioning of a wireless communication network by capturing metrics associated with frequency resources that may be used to deploy and/or optimize network hardware. For example, the systems, devices, and techniques may determine when a network resource is occupied by a legacy transmission element (e.g., a television station) to determine that the legacy transmission element may be disabled to allow for the network resource to be utilized for communications by and between UE. Further, determining metrics may allow network engineers to tune components (e.g., power level(s), antenna orientation(s), frequency overlap(s), and the like) in a system to reduce interference caused by the various components. Additionally, the systems, devices, and techniques discussed herein provide a distributed framework for spectrum analysis, which may provide network information more efficiently than drive testing, for example. In some configurations, the techniques may be used to reduce power consumption to extend a battery life of a UE during testing. Further, location-based initiating of scanning may reduce congestion and/or processing of data where such data is not needed. The systems, devices, and techniques discussed herein may also be used to determine network characteristics in locations where there is no signal, such as, for example, within buildings or structures that do not permit some signals to transmit from or to an interior space of the building. These and other improvements to the functioning of a computer and network are discussed herein.

The systems, devices, and techniques described herein may be implemented in a number of ways. Example implementations are provided below with reference to the following figures.

FIG. 1 illustrates an example wireless communication network 100 including a user equipment (UE) 102 including a spectrum analyzer component 104 and one or more transceiver(s) 106 to facilitate mobile collection of network metrics, as described herein.

In general, the UE 102 may receive a signal 108 output by a network transceiver 110, e.g., a cell tower (base station) or other access point, to determine one or more metrics associated with the signal 108. The network transceiver 110 provides coverage to a cell within the wireless communication network 100, where the cell is a geographic region or coverage area with the wireless communication network 100. In some configurations, the UE 102 may receive the signal 108 and analyze the signal 108, as discussed herein, independent of conducting any communications via the signal 108 and/or the network transceiver 110. In some configurations, the network transceiver 110 may represent any one-directional or two-directional wireless communication transceiver.

In some configurations, the one or more transceiver(s) 106 may receive the signal 108 at the UE 102, and the spectrum analyzer component 104 may determine various metrics associated with the signal 108. For example, the one or more metrics may include, but are not limited to, one or more of a received signal strength indication (RSSI), a reference signal received power (RSRP), a reference signal received quality (RSRQ), and a signal-to-interference-plus-noise ratio (SINR). For example, the metrics may include one or more values indicative of RSRP. Further, the metrics may include a channel identifier (e.g., channel 1, 2, . . . , N (where N is an integer)) and/or an indication of a frequency associated with a channel (e.g., 617-622 MHz, 622-627 MHz, 627-632 MHz, . . . , 647-652 MHz). In some configurations, the metrics may include a number of channels associated with a particular frequency band. In some configurations, the metrics may be determined independently for a channel or for a block of frequencies.

In some configurations, based at least in part on metrics, the UE 102 and/or a network device 112 may determine characteristics of the signal 108, such as whether the signal is a television signal or a signal for wireless communication (e.g., to exchange (bidirectional) voice and/or data). In some configurations, the metrics may include one or more roaming network indicators including one or more MCCs, one or more MNCs, etc. RSRP, often measured in decibel-milliwatts (dBm), is the average power of Resource Elements (RE) that carry cell specific Reference Signals (RS) over the entire bandwidth, so RSRP is only measured in the symbols carrying RS. The average power received from a single RS is often quantified in terms of signal ranges. In some configurations, the UE 102 may receive a plurality of signals, for example, by tuning one or more filters associated with the transceiver(s) 106, to isolate a specific frequency of a signal. Other techniques may be used to configure the UE 102 to receive a range of frequencies.

The UE 102 may communicate with one or more network device(s) 112 via one or more network(s) 114. For example, the transceiver(s) 106 of the UE 102 may transmit transmission information 124 to the one or more network device(s) 112, where the transmission information 124 includes signal strength information. Additionally, the transmission information 124 may include an audio data packet loss of one or more audio data packets associated with an audio data transmission within the wireless communication network 100.

FIG. 1 illustrates the UE 102 capturing transmission information 124 associated with the network transceiver 110, as described herein. In some configurations, the UE 102 may receive the signal 108 output by the network transceiver 110 and may determine the transmission information 124 associated with the signal 108. As illustrated, the transmission information 124 associated with the signal 108 may include information indicative of signal strength of the signal 108 as it is received at the UE 102, location of the UE 102, and other information. For example, the transmission information 124 depicted in FIG. 1 may include RSSI, RSRP, MCC, MNC, a network type, global positioning system (GPS) information, a packet loss of one or more audio data packets associated with an audio data transmission within the wireless communication network 100, and other information. The transmission information 124, and particularly, the example information included in the transmission information 124 as depicted in FIG. 1, are only examples and not meant to be limiting.

In some configurations, the network device(s) 112 may include an aggregation component 116 that may receive one or more pieces of transmission information 124 from the UE 102, as well as other UE, and aggregate the transmission information 124 to generate a visualization 118 and/or one or more handover instruction(s) 122. In some configurations discussed herein, the visualization 118 may be used, at least in part, to determine packet loss rates, to determine thresholds, to determine and/or indicate locations of transmitters that are active and that are predicted to provide signals having predetermined signal strengths (e.g., RSRP), to determine locations where to deploy base stations or other network devices 112, to determine and/or indicate locations having and not having signal strength that meets or exceeds a signal strength threshold, to determine and/or indicate locations where a call density associated with the location meets or exceeds a call density threshold, to determine and/or indicate locations where a network signal is associated with poor quality, to inform decisions regarding handover processes, and to inform decisions regarding optimization of wireless transmissions, among other functions.

For example, the recommendation component 120 may be configured to determine whether a predicted signal strength differs from an aggregated signal strength, and compare the difference of the aggregated and predicted signal strength by evaluating whether the difference meets or exceeds a signal strength threshold. The recommendation component 120 may determine whether a call density associated with the location meets or exceeds a call density threshold, and generate the one or more handover instruction(s) 122, which may include a message to update a hardware component associated with the location. As may be understood, the aggregation component 116 and the recommendation component 120 are not limited to outputting the visualization 118 and the handover instruction(s) 122, and any number of visualizations, recommendation(s), or data may be utilized, as discussed herein.

In some configurations, recommendation component 120 may generate handover instructions 122 may that include one or more thresholds for determining when to hand over UEs 102 from one cell of the wireless communication network 100 and/or one cell channel to another cell and/or cell channel, as will be discussed further herein. The handover instructions 122 may be provided to UEs 102 and/or other network devices 112.

Examples of the UE 102 may include, but are not limited to, smart phones, mobile phones, cell phones, tablet computers, portable computers, laptop computers, personal digital assistants (PDAs), electronic book devices, or any other portable electronic devices that may generate, request, receive, transmit, or exchange voice, video, and/or digital data over a network. Additional examples of the UE 102 may include, but are not limited to, smart devices such as televisions, refrigerators, washing machines, dryers, smart mirrors, coffee machines, lights, lamps, temperature sensors, music players, headphones, or any other electronic appliances that may generate, request, receive, transmit, or exchange voice, video, and/or digital data over a network.

In some configurations, the network device(s) 112 may be implemented as one or more communication servers to facilitate communications by and between the various devices in the wireless communication network 100. That is, the network device(s) 112 may represent any computing devices implementing various aspects of one or more of second, third, fourth, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the network device(s) 112 may implement GSM, UMTS, LTE/LTE, and/or NR Advanced telecommunications technologies. The network device(s) 112 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 102, the network device(s) 112, and/or the network(s) 114. In some configurations, the network device(s) 112 may be operated by a service provider, e.g., an operator of the wireless communication network 100. While the network device(s) 112 are described with respect to the wireless communication network 100, it is to be understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

Examples of the network(s) 114 may include, but are not limited to networks including second-generation (2G), third-generation (3G), fourth-generation (4G), or fifth-generation (5G) cellular networks, such as NR (New Radio), LTE (Long Term Evolution), and data networks, such as Wi-Fi networks.

In some configurations, the UE 102 may communicate with any number of UEs, servers, network devices, computing devices, and the like. Further, in some configurations, the UE 102 may send the transmission information 124 to a network device (such as the network device(s) 112) for aggregation and processing.

In some configurations, the UE 102 may monitor the signal 108 without utilizing the frequency resources associated with the signal for communication(s). That is, the UE 102 may communicate with other devices using a separate base station or wireless transceiver, not illustrated in FIG. 1.

As previously noted, RSRP and RSRQ are affected by the UE traffic on communication channels. If there are many active UEs at the same time and location on the same band (communication channel), the RSRP and RSRQ will become lower. Thus, in such cases traffic needs to be moved from the congested band to a different band with lower traffic using a handover process. Such handover process may be from the network transceiver 110 to another network transceiver, e.g., from one cell of the wireless communication network 100 to another cell, or may be from one cell channel to another cell channel, with both cell channels being handled by the network transceiver 110.

Using network and audio quality Key Performance Indicators (KPIs), a correlation between the network KPIs and audio quality may be identified. In one example, 15 network KPIs (generally known for wireless communication networks) and 3 audio quality KPIs may be analyzed. The 3 audio quality KPIs may include 1) [Total] audio data packet loss, which is the total audio data packet loss amount per each cell. The more calls the cell serves, the more loss the cell may cause; 2) [total] call (audio data transmission) count, which is mainly capacity impact; and 3) [rate] loss per call, ([sum of total percentage of loss]/[number of total calls served by the cell]), which is the average loss amount per call. The rate loss per call generally represents less capacity impact but more cell signal condition.

For example, Table 1 illustrates 15 example network KPIs. The top five highly correlated KPIs include PMRRCCONNREESTATTQCI, PMHOOSCINTERF, PMHOOSCINTRAF, PMHOPREPATTLTEINTERF, and PMHOPREPATTLTEINTRAF. Table 2 illustrates example KPI correlation coefficients. The correlation coefficient is between −1.0 and 1.0 for no correlation. A value of 1 represents total positive correlation, while a value of −1 represents total negative correlation.

TABLE 1

| | |
|---|---|
| RRCRESTABLISHMENTRATE | Ratio of RRC (radio resource control) Re-establishment Attempt for QCI1 to the Total Calls(%) |
| INTERHOOSCILATIONRATE | Ratio of RRC Re-establishment Attempt for QCI1 to the Total Calls(%) |
| INTRAHOOSCILATIONRATE | Ratio of the Intra HO (handover) Oscitation to Total Handover Preparation Attempts(%) |
| VOLTEULPACKETLOSS | VoLTE uplink Packet Loss (%) |
| PMRRCCONNREESTATTQCI | Number of RRC Connection Re-establishment Attempts on the QCI1 |
| PMHOOSCINTERF | Counter pmHoOscInterF counts every inter-frequency HO that is considered to be an oscillating HO. pmHoOscInterF is incremented when handover preparation is attempted. |
| PMHOOSCINTRAF | Counter pmHoOscIntraF counts every intra-frequency HO that is considered to be an oscillating HO. pmHoOscIntraF is incremented when handover preparation is attempted. |
| PMHOPREPATTLTEINTERF | The number of attempts to start outgoing intra LTE inter frequency handover preparation. |
| PMHOPREPATTLTEINTRAF | The number of attempts to start intra LTE intra frequency handover preparation. |
| DLPKTLOSSDISCARDQCI1 | Downlink Packet Loss Discard QCI1 (%) |
| DLPACKETLOSSDUETOHO | Downlink Packet Loss due to HO |
| DLPKTLOSSDISCARD | Downlink Packet Loss Discard (%) |
| ULPACKETLOSSALLQCI | Uplink Packet Loss(%) |
| DLPACKETLOSSQCI1 | Downlink Packet Loss Rate- QCI1(%) |
| RLCPACKETLOSS | Radio Level Packet Loss Downlink(%) |

TABLE 2

| | Echo Locate KPIs | | |
|---|---|---|---|
| | [total] audio packet loss | [total] call count | [rate] loss per call |
| RRCRESTABLISHMENTRATE | 0.25 | 0.29 | 0.05 |
| INTERHOOSCILATIONRATE | 0.08 | 0.04 | 0.03 |
| INTRAHOOSCILATIONRATE | 0.07 | 0.05 | 0.03 |
| VOLTEULPACKETLOSS | 0.14 | 0.17 | 0.01 |
| PMRRCCONNREESTATTQCI1 | 0.66 | 0.44 | 0.53 |
| PMHOOSCINTERF | 0.54 | 0.32 | 0.48 |
| PMHOOSCINTRAF | 0.53 | 0.36 | 0.44 |
| PMHOPREPATTLTEINTERF | 0.57 | 0.34 | 0.53 |
| PMHOPREPATTLTEINTRAF | 0.61 | 0.41 | 0.51 |
| DLPKTLOSSDISCARDQCI1 | 0.05 | 0.20 | −0.12 |
| DLPACKETLOSSDUETOHO | 0.19 | 0.23 | 0.06 |
| DLPKTLOSSDISCARD | 0.09 | 0.18 | −0.07 |
| ULPACKETLOSSALLQCI | 0.13 | 0.15 | 0.02 |
| DLPACKETLOSSQCI1 | 0.07 | 0.18 | −0.10 |
| RLCPACKETLOSS | 0.15 | 0.23 | 0.00 |

Based at least in part on calculating the correlation using, for example, Pearson correlation coefficient, for all the combinations between the 15 network KPIs and the 3 audio quality related KPIs, 5 network KPIs may be identified to have relatively bigger correlation with audio quality. In this example, the 5 network KPIs identified are related to handover (cell change and/or cell channel change), e.g., PMRRCCONNREESTATTQCI, PMHOOSCINTERF, PMHOOSCINTRAF, PMHOPREPATTLTEINTERF, and PMHOPREPATTLTEINTRAF.

Thus, to improve audio quality, e.g., reduce audio data packet loss, handover instructions 122 may be controlled using thresholds, where the handover instructions 122 may be based on the RSRP and RSRQ. According to known 3GPP technical specifications, the standard for handover includes, among other events, A1, A2 and A5 events. The A1 event is defined as the serving cell (connected cell) becomes better than a threshold. The A2 event is defined as the serving cell becomes worse than the threshold. The A5 event is defined as the serving cell becomes worse than a first threshold and a neighbor cell becomes better than a second threshold.

The 3GPP technical specification defines the types of events and the types of signal condition metrics (RSRP, RSRQ) to utilize in the handover decision process, the 3GPP technical specification does not mandate particular values for the thresholds and each field engineering team of the wireless communication network 100 may choose to use only one of the signal metrics rather than both RSRP and RSRQ. Furthermore, different threshold values may be applied on different cells so that cells in one configuration may serve more traffic than other cells in another configuration.

Since audio quality is correlated to the handover process based on a correlation analysis between the audio quality and the network KPIs, in accordance with one example of the present disclosure, the following parameters for one instance of a handover process were determined:

1) A1, A2, A5 thresholds are changed on RSRP on each band (e.g., L700—LTE 700 MHz, L1900—LTE 1900 MHz, L2100—LTE 2100 MHz);
2) A1, A2, A5 thresholds are added on RSRQ. Previously RSRQ was not considered for the handover processes; and
3) A separate set of RSRP/RSRQ thresholds on the QCI1 bearer, which is the radio bearer for audio packets on voice over LTE calls.

RSRP and RSRQ are affected by the UE traffic on channels. If there are many active UEs at the same time and location on the same band (channel), the RSRP and RSRQ will become lower. Thus, in such cases UE traffic needs to be moved from the congested band to a different band with lower traffic. By changing A1/A2/A5 thresholds on different bands and also considering RSRQ, the handover process may happen more effectively to prevent from audio issues and the effect may be verified with the reduction in the audio loss rate, e.g., loss of audio data packets. The thresholds may be with respect to RSRP offset frequencies and/or RSRQ offset frequencies.

Thus, handover instructions 122 may be generated by the recommendation component 120 that include one or more thresholds for determining when to hand over UEs 102 from one cell of the wireless communication network 100 and/or one cell channel to another. The handover instructions 122 may be provided to UEs 102 associated with a serving cell. For example, if the UE 102 is connected to L2100 cell A at −118 dBm and a detected signal with −110 dBm is detected from L700 cell B, the network device 112 may decide to hand the UE 102 over from cell A to cell B if the threshold for L2100 to L700 was −118 dBm. However, the audio quality may be improved by moving the UE 102 from L2100 to L700 more quickly, e.g. changing the threshold from −118 to −115. Thus, the handover instructions 122 may include changing the threshold from −118 to −115 for events A1, A2 and/or A5.

Figure 2:
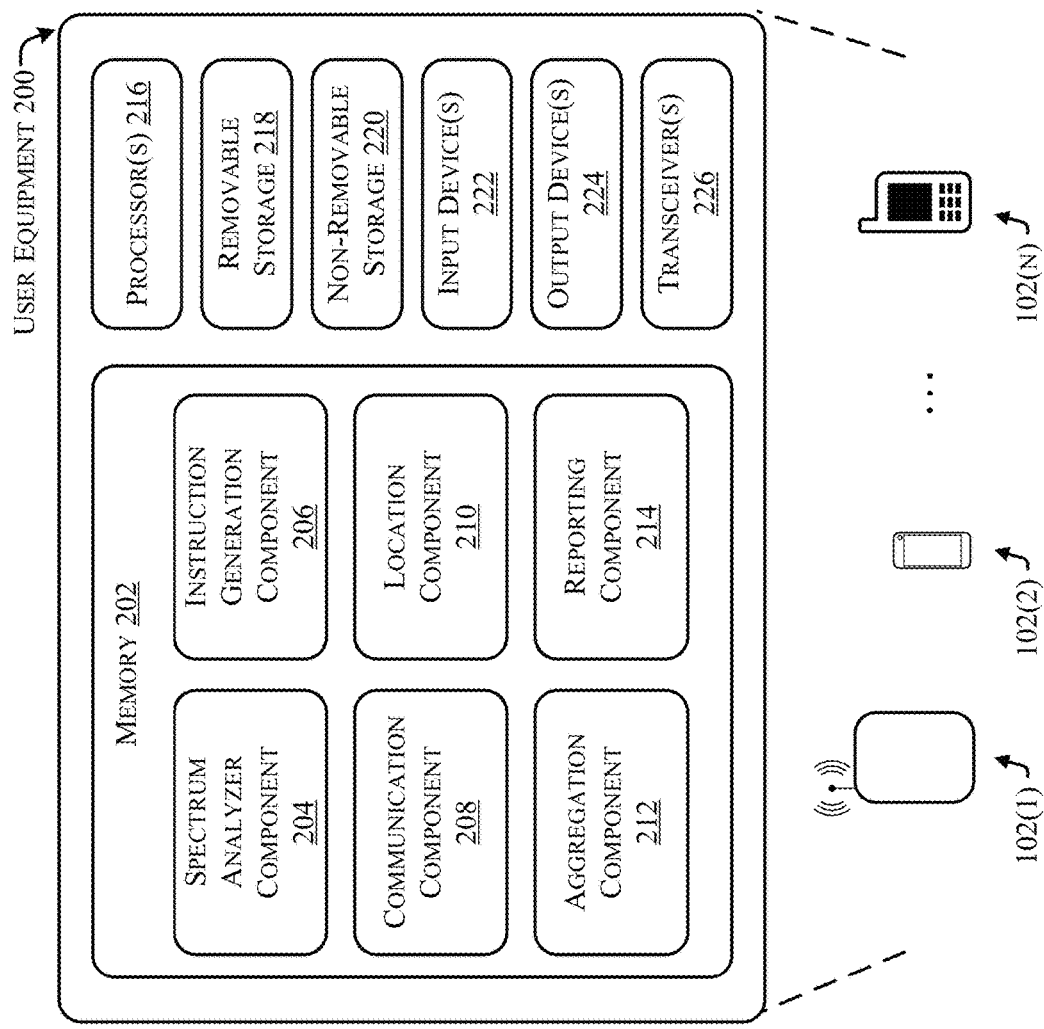
FIG. 2 illustrates an example environment including a user equipment capturing metrics associated with a transmitter, as described herein.

In one use case, the techniques discussed herein may be implemented on a UE configured to facilitate user communications using first frequency resources. In some configurations, the first frequency resources may include, but are not limited to, an LTE Band 12 (e.g., a 700 MHz Band), an LTE Band 4 (e.g., 1700 MHz band and/or a 2100 MHz band), an LTE Band 2 (e.g., a 1900 MHz band), an LTE Band 66 (e.g., a 1700 MHz band and/or a 2100 MHz extended band), a UMTS Band 4, UMTS Band 2, GSM Band 2, 5G (e.g., 3.5 GHz-6 GHz, 28 GHz, etc.) and the like. Further, a spectrum analyzer may be implemented as an application on the UE to intermittently scan second frequency resources. In some configurations, the second frequency resources may be separate from the first frequency resources. For example, the second frequency resources may include, but are not limited to, an LTE Band 71 (e.g., a 600 MHz band), an LTE Band 48 (e.g., 3400 MHz), and the like. The first frequency resource and the second frequency resource may include any range of wireless frequencies capable of being used to communicate data. Thus, in general, the techniques may include the UE using the first frequency resources for communication(s) (e.g., voice communication, data communications, etc.), and using the spectrum analyzer to scan the second frequency resources, without using the second frequency resources for communication(s). However, in some configurations, the techniques may include utilizing the second frequency resources for communication(s), while monitoring metrics associated with the resources to determine sources of interference, for example FIG. 2 illustrates an example UE 200, e.g., mobile device, configured to implement the spectrum analyzer, in accordance with configurations of the present disclosure. In some configurations, the UE 200 may correspond to the UE 102 of FIG. 1. It is to be understood in the context of the present disclosure that the UE 200 may be implemented as a single device or as a plurality of devices with components and data distributed among them. By way of example, and without limitation, the UE 200 may be implemented as various UE 102(1), 102(2), . . . , 102(N).

As illustrated, the UE 200 comprises a memory 202 storing a spectrum analyzer component 204, an instruction generation component 206, a communication component 208, a location component 210, a aggregation component 212, and a reporting component 214. Also, the UE 200 may include processor(s) 216, a removable storage 218 and non-removable storage 220, input device(s) 222, output device(s) 224, and transceiver(s) 226.

In various configurations, memory 202 is volatile (such as RAM), non-volatile (such as ROM, flash memory, etc.) or some combination of the two. The spectrum analyzer component 204, the instruction generation component 206, the communication component 208, the location component 210, the aggregation component 212, and the reporting component 214 stored in the memory 202 may comprise methods, threads, processes, applications or any other sort of executable instructions. The spectrum analyzer component 204, the instruction generation component 206, the communication component 208, the location component 210, the aggregation component 212, and the reporting component 214 may also include files and databases.

In some configurations, the spectrum analyzer component 204 may correspond to the spectrum analyzer component 104 of FIG. 1. The spectrum analyzer component 204 may include functionality to determine one or more metrics associated with a signal received, detected, or otherwise monitored by the UE 200. For example, the spectrum analyzer component 204 may determine metrics including, but not limited to, audio data packet losses, audio data packet loss rates, etc., for a specific bandwidth in the frequency domain. In some configurations, the spectrum analyzer component 204 may determine metrics including, but not limited to RSSI, RSRP, RSRQ, SINR, power density and the like for a specific bandwidth in the frequency domain. In some configurations, information may be associated with the metrics, such as a band number, channel number, block identifier, and the like. In some configurations, the spectrum analyzer component 204 may scan a frequency resource at any regular or irregular interval, or may initiate a scan based on an internal or external trigger or command. For example, the spectrum analyzer component 204 may receive an instruction from a remote network device to initiate a scan. In some configurations, the spectrum analyzer component may determine operating conditions or characteristics of the UE 200 (e.g., a power resource, location, etc.), and a command to initiate scanning may be based at least in part on those operating conditions or characteristics. In some configurations, the spectrum analyzer component 204 may include previously-collected measurements. In some configurations, the spectrum analyzer component 204 may sample conditions of a signal over a period of time and perform a statistical analysis to determine additional metrics (e.g., average, median, high, low, etc.) associated with the signal.

In some configurations, the spectrum analyzer component 204 may be implemented as an application operating on the UE 200. In some configurations, to initiate a s of one or more frequency resources, the spectrum analyzer component may call an API (application programming interface) implemented in an operating system on the UE 200.

In some configurations, the spectrum analyzer component 204 may include functionality to present a user interface on the UE 200, for example, to receive an indication from a user enabling or disabling a spectrum analyzer mode of the spectrum analyzer component 204. For example, in some configurations, a user of the UE may turn on or turn off the spectrum analyzer component 204 based on personal preferences, incentives from a service provider, inclusion in a voluntary program, and the like.

The instruction generation component 206 may include functionality to query a chipset of the UE 200, and/or to query the transceiver(s) 226, to instruct the transceiver(s) 226 and/or any software or hardware to scan one or more channels or frequency resources to determine metrics associated with the channel or frequency resources, for example. In some configurations, the instruction generation component 206 may include a first API to receive instructions from the spectrum analyzer component 204 and to provide data to the spectrum analyzer component 204, and a second API to issue instructions to software or hardware associated with a modem or the transceiver(s) 226 and to receive data from such components. In some configurations, the instruction generation component 206 may include a third API to receive handover instruction(s) 122. Based on the handover instruction(s) 122, the instruction generation component 206 may generate one or more instructions for the UE 200 to change cells and/or cell channels.

The communication component 208 may include functionality to conduct communications with one or more other devices, e.g., other UEs 200, network devices 112, etc., as discussed herein. In some configurations, the communication component 208 may conduct a communication via a first set of frequency resources, while the spectrum analyzer component 204 may analyze a second set of frequency resources. In some configurations, at least a portion of the first set and the second set of frequency resources may be overlapping, and in some configurations, the first set and the second set of frequency resources may be independent. In some configurations, the communication component 208 may take priority over resources of the UE 200 to conduct a communication. That is, if the spectrum analyzer component 204 initiates a scan of a frequency resource, and if the communication component 208 subsequently initiates a communication using the frequency resource or another frequency resource, in some configurations, the communication component 208 may initiate the communication by interrupting the spectrum analyzer component 204. In some configurations, other prioritization schemes may be used, and the communication component 208 may have any relative or absolute priority level.

The location component 210 may include functionality to determine a location of the UE 200. In some configurations, the location component 210 may determine a location based at least in part on GPS location data, base station identity, Wi-Fi access point identity, or a combination of location sources. In some configurations, a location may include a mobile network code (MNC) and a mobile country code (MCC) used in combination to uniquely identify a mobile network carrier network. In some configurations, the location component 210 may determine a base station or cell identity, and/or latitude, longitude, altitude information, and timestamp information. In some configurations, the location may be determined in connection with determining one or more metrics associated with a signal or channel. In some configurations, the location may be provided to a network device, for example, for aggregation and analysis. In some configurations, the location component 210 may determine a location of the UE 200 relative to a location of a geofenced location. For example, the location component 210 may receive a geofenced location from a network device.

The aggregation component 212 may include functionality to aggregate signal strength information and audio data packet loss information associated with the UE 200, including one or more of the transmission information 124 discussed with respect to FIG. 1. For example, the aggregation component may evaluate RSSI, RSRP, MCC, MNC, network type information, location information received from the location component 210, time and/or date information, etc., and save the metrics to the removable storage 218 and/or the non-removable storage 220. As discussed hereafter, one or more triggering events may cause the UE 200 to transmit the signal strength information by retrieving the metrics from the removable storage 218 and/or the non-removable storage 220, and transmitting the signal strength information via the transceiver(s) 226 to the network device(s) 112.

The reporting component 214 may include functionality to store one or more metrics associated with one or more frequency resources and to send such metrics to a network device. In some configurations, the reporting component 214 may send the one or more metrics to a network device as the one or more metrics are generated, captured, or determined. In some configurations, the reporting component 214 may send the metrics to the network device. In some configurations, the reporting component 214 may send the metrics based on a connection type of the UE 200 (e.g., when the UE 200 is connected to a Wi-Fi network). In some configurations, the reporting component 214 may send the metrics at a time of low network congestion (e.g., at night). In some configurations, the reporting component 214 may transmit metrics in response to a query from a network device, for example. In some configurations, the reporting component 214 may encode the data sent to a network device such that a service provider tracking data usage does not count the data against a quota associated with the UE 200.

In some configurations, the processor(s) 216 is a central processing unit (CPU), a graphics processing unit (GPU), or both CPU and GPU, or other processing unit or component known in the art.

The UE 200 may also include additional data storage devices (removable and/or non-removable) such as, for example, magnetic disks, optical disks, or tape. Such additional storage is illustrated in FIG. 2 by removable storage 218 and non-removable storage 220. Tangible computer-readable media may include volatile and non-volatile, removable and non-removable media implemented in any method or technology for storage of information, such as computer readable instructions, data structures, program modules, or other data. Memory 202, removable storage 218 and non-removable storage 220 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which may be used to store the desired information and which may be accessed by the UE 200. Any such tangible computer-readable media may be part of the UE 200.

In various configurations, the UE 200 may also include applications including but not limited to, a web browser application, a video streaming application, an online gaming application, a spectrum analyzer, and the like. During execution on the UE 200, each of the applications may be configured to cause the UE 200 to initiate data communications with the network device(s) 112 over the network(s) 114.

The UE 200 may be configured to communicate over a wireless communication network using any common wireless and/or wired network access technology. Moreover, the UE 200 may be configured to run any compatible device operating system (OS), including but not limited to, Microsoft Windows Mobile, Google Android, Apple iOS, Linux Mobile, as well as any other common UE OS.

The UE 200 also may include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the UE 200 also includes one or more wired or wireless transceiver(s) 226. For example, the transceiver(s) 226 may include a network interface card (NIC), a network adapter, a LAN adapter, or a physical, virtual, or logical address to connect to various network(s) 114, or to the network device(s) 112, for example. To increase throughput when exchanging wireless data, the transceiver(s) 226 may utilize multiple-input/multiple-output (MIMO) technology. The transceiver(s) 226 may comprise any sort of wireless transceivers capable of engaging in wireless, radio frequency (RF) communication. The transceiver(s) 226 may also include other wireless modems, such as a modem for engaging in Wi-Fi, WiMax, Bluetooth, infrared communication, and the like.

In some configurations, the transceiver(s) 226 may correspond to the transceiver(s) 106 of FIG. 1.

Figure 3:
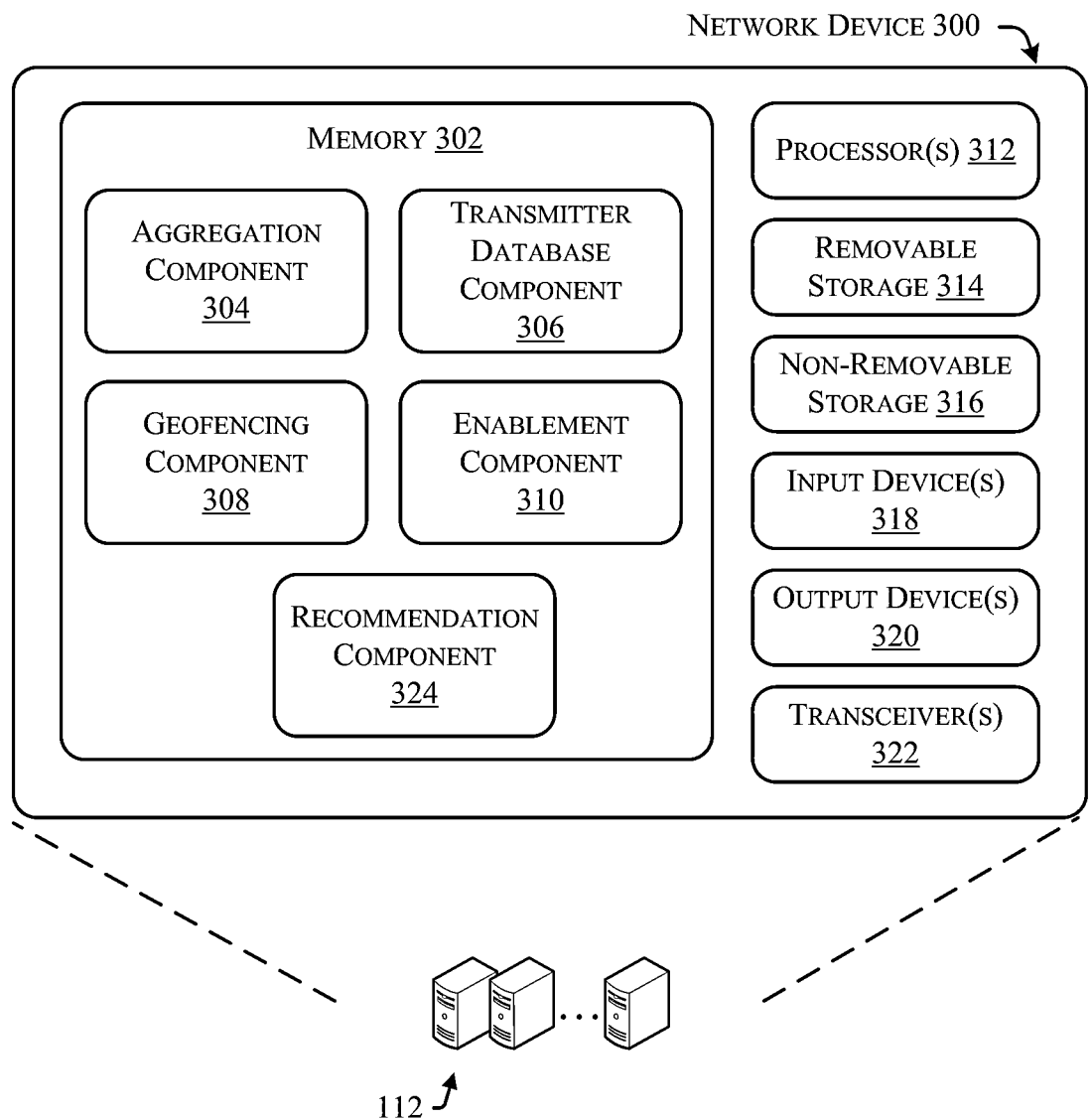
FIG. 3 illustrates an example network device configured to receive network metrics captured by user equipment, in accordance with configurations of the present disclosure.

FIG. 3 illustrates an example network device 300 configured to receive network metrics captured by UE, in accordance with configurations of the present disclosure. In some configurations, the network device 300 may correspond to the network device(s) 112 of FIG. 1. It is to be understood in the context of this disclosure that the network device 300 may be implemented as a single device or as a plurality of devices with components and data distributed among them.

As illustrated, the network device 300 comprises a memory 302 storing an aggregation component 304, a transmitter database component 306, a geofencing component 308, an enablement component 310, and a recommendation component 324. Also, the network device 300 includes processor(s) 312, a removable storage 314 and non-removable storage 316, input device(s) 318, output device(s) 320, and transceiver(s) 322.

In various configurations, the memory 302 is volatile (such as RAM), non-volatile (such as ROM, flash memory, etc.) or some combination of the two. The aggregation component 304, the transmitter database component 306, the geofencing component 308, and the enablement component 310 stored in the memory 302 may comprise methods, threads, processes, applications or any other sort of executable instructions. The aggregation component 304, the transmitter database component 306, the geofencing component 308, and the enablement component 310 may also include files and databases.

The aggregation component 304 may include functionality to receive one or more metrics determined and/or captured by UE, as discussed herein. In some configurations, the aggregation component 304 may receive a plurality of metrics and store the metrics in a database. In some configurations, the metrics may be indexed by location, time, UE, and the like. In some configurations, the aggregation component 304 may perform any statistical analysis on the metrics to determine a variety of signal characteristics. For example, the aggregation component 304 may determine a signal type (e.g., TV, radio, cell phone, etc.) as well as quantitate or qualitative characteristics of the signal.

In some configurations, the aggregation component 304 may correspond to the aggregation component 116 of FIG. 1.

The transmitter database component 306 may store locations of transmitters and/or base stations in a database. Further, the transmitter database component 306 may receive location data and/or metrics associated with a signal to determine which transmitter corresponds to the metrics. In some configurations, the transmitter database component 306 may determine a confidence value associated with the identity of a transmitter or base station.

The geofencing component 308 may include functionality to determine areas in which the spectrum analysis should be performed. For example, the geofencing component 308 may determine areas around a legacy transmitter (e.g., a TV antenna) where metrics are to be determined. In some configurations, the geofencing component 308 may determine areas where network resources (e.g., new base stations) are to be deployed to confirm signal status in that area. In some configurations, the geofencing component 308 may determine areas where signal characteristics are known such that the spectrum analysis is not needed. In some configurations, the geofencing component 308 may send indications of the geofenced locations to one or more UE to collect metrics, as discussed herein.

The enablement component 310 may include functionality to enable a spectrum analysis component for individual user equipment, e.g., UE 200. For example, the enablement component 310 may send invitations to various UE to determine if users of the UE wish to activate the spectrum analyzer, as discussed herein. In some configurations, the enablement component 310 may enable the spectrum analyzer component for individual UE based at least in part on characteristics of the user component, such as whether an antenna of the UE is configured to receive signals associated with particular frequency resources.

In some configurations, the recommendation component 324 may correspond to the aggregation component 120 of FIG. 1.

In further examples, the enablement component 310 may provide an instruction or indication to conduct drive-testing in an area based at least in part on metrics obtained by UE, as discussed herein.

The recommendation component 324 may include functionality to generate handover instructions 122 may that include one or more thresholds for determining when to hand over UEs 200 from one cell of the wireless communication network 100 and/or one cell channel to another cell and/or cell channel, as will be discussed further herein. The handover instructions 122 may be provided to UEs 102 and/or other network devices 300.

In further examples, the recommendation component 324 may include functionality to determine whether a predicted signal strength differs from an aggregated signal strength, and compare the difference of the aggregated and predicted signal strength by evaluating whether the difference meets or exceeds a signal strength threshold. The recommendation component 120 may determine whether a call density associated with the location meets or exceeds a call density threshold, and generate the one or more handover instruction(s) 122, which may include a message to update a hardware component associated with the location. As may be understood, the aggregation component 116 and the recommendation component 324 are not limited to outputting the visualization 118 and the handover instruction(s) 122, and any number of visualizations, recommendation(s), or data may be utilized, as discussed herein.

In some configurations, the processor(s) 312 is a central processing unit (CPU), a graphics processing unit (GPU), or both CPU and GPU, or other processing unit or component known in the art.

The network device 300 also includes additional data storage devices (removable and/or non-removable) such as, for example, magnetic disks, optical disks, or tape. Such additional storage is illustrated in FIG. 3 by removable storage 314 and non-removable storage 316. Tangible computer-readable media may include volatile and nonvolatile, removable and non-removable media implemented in any method or technology for storage of information, such as computer readable instructions, data structures, program modules, or other data. Memory 302, removable storage 314 and non-removable storage 316 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which may be used to store the desired information and which may be accessed by the network device 300. Any such tangible computer-readable media may be part of the network device 300.

The network device 300 may include input device(s) 318, such as a keypad, a cursor control, a touch-sensitive display, etc. Also, the network device 300 may include output device(s) 320, such as a display, speakers, etc. These devices are well known in the art and need not be discussed at length here.

As illustrated in FIG. 3, the network device 300 may include one or more wired or wireless transceiver(s) 322. In some wireless configurations, to increase throughput, the transceiver(s) 322 may utilize multiple-input/multiple-output (MIMO) technology. The transceiver(s) 322 may be any sort of wireless transceivers capable of engaging in wireless, radio frequency (RF) communication. The transceiver(s) 322 may also include other wireless modems, such as a modem for engaging in Wi-Fi, WiMax, Bluetooth, infrared communication, or the like.

Figure 4:
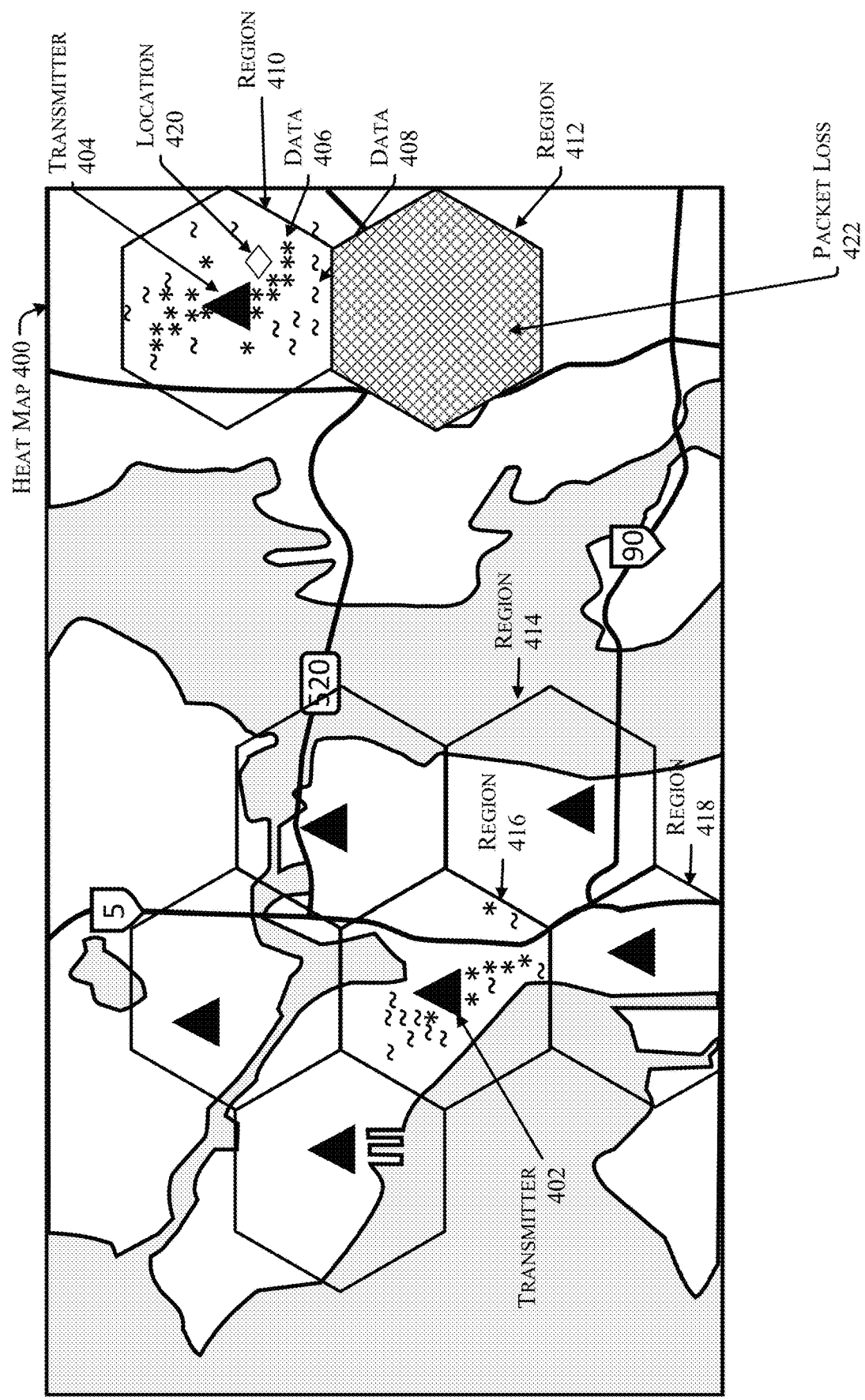
FIG. 4 illustrates an example visualization of data, in accordance with configurations of the present disclosure.

FIG. 4 illustrates an example visualization of data including data captured using a spectrum analyzer, as discussed herein. In some configurations, the example visualization may be represented as a heat map 400.

In some configurations, the heat map 400 may represent various transmitters 402 and 404 in a wireless communication network, e.g., wireless communication network 100. Further, the heat map 400 may represent various data 406 and 408, which may correspond to aggregated data and/or individual metrics collected by UE 200 and/or network device 300, as discussed herein. The heat map 400 may also represent various locations bounded by geographic regions or coverage areas, e.g., cells, which are depicted as regions 410, 412, 414, 416, and 418. One or more locations 420 may be included in the heat map 400, which may be a sub-region, a building, a set of buildings, etc.

In configurations, the heat map 400 may include an indication of a packet loss rate for one or more of the regions 410-418. For example, the region 412 depicts a packet loss rate 422, e.g., an audio data packet loss rate, which is depicted as a hatch pattern within the region 412. In configurations, the region 412 may depict packet losses 422, e.g., audio data packet losses. Although not shown in FIG. 4, a packet loss rate or packet losses may be associated with any or all of the regions 410-418. The data 406 and 408 may include data related to packet losses, packet loss rates, audio data transmissions (calls), etc., as determined by the UE 200 and/or network devices 300. For example, a relatively high packet loss rate may be represented as the data 406, corresponding to the symbol "*". The transmission information 124 (FIG. 1) may be one example of the data 406 and 408.

In some configurations, the data 406 and 408 may include signal strength information comprising one or more metrics, such as RSSI, RSRP, RSRQ, SINR, MCC, MNC, network type, etc., as determined by the UE 200. For example, a relatively high RSSI metric may be represented as the data 406, corresponding to the symbol "*". The transmission information 124 (FIG. 1) may be one example of the data 406 and 408. In some examples, a relatively lower RSSI metric may be represented as the data 408, corresponding to the symbol "—". Of course, any indications (e.g., color, size, shape, labels, etc.) may be used to distinguish between various metrics. Although only 5 regions are depicted, it should be appreciated that any number of regions may be included in the heat map 400.

In some configurations, the heat map 400 may be used, at least in part, to determine one or more recommendations (e.g., the handover instruction(s) 122 in FIG. 1). The handover instruction(s) 122 may include one or more suggested locations where active transmitters (e.g., the transmitter 402 or 404) are located, where UE experience interference, weak or strong signal strength, etc., and/or where to deploy additional base stations, for example. In other configurations, the size, shape, location, call density, or other information associated with the regions 410-418 may be used to determine one or more recommendations for augmenting the infrastructure of the wireless communication network 100. In further configurations, the handover instructions 122 may include one or more thresholds for use in handover processes between cells and/or cell channels.

In some configurations, the heat map 400 may include a geographic region associated with the network transceiver, where the geographic region is output having a color associated with the coverage area. The color may be indicative of the aggregated signal strength associated with the network transceiver. In other aspects, the geographic region may be output having a pattern representative of the aggregated signal strength, and/or an opacity associated with the aggregated signal strength, and/or call density.

In some configurations, the heat map 400 may be generated by the aggregation components 116 and 404, as discussed herein. Of course, the example visualizations are not limited to the heat map 400. Further, the transmitters 404 and 404 are not limited to transmitters, and include any transceivers and/or base stations.

Figure 5:
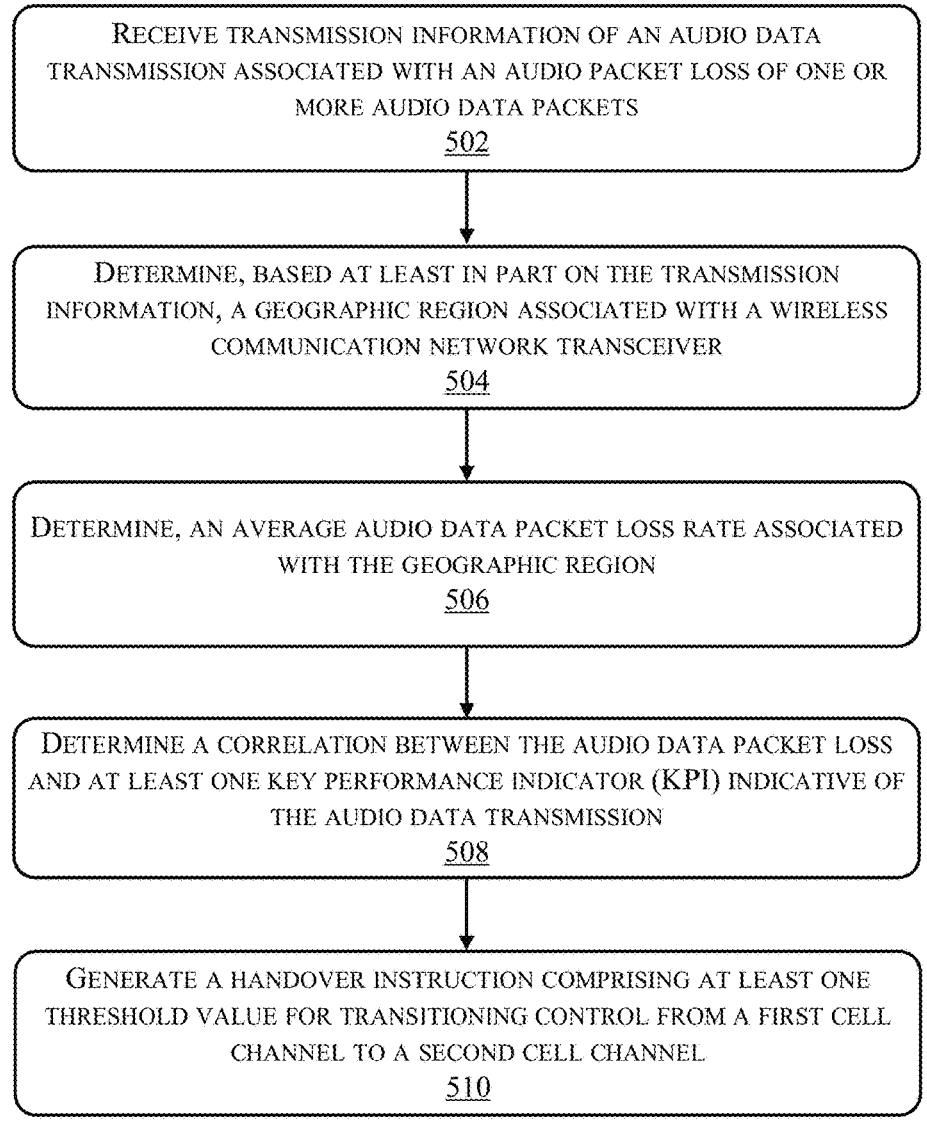
FIG. 5 illustrates an example process in accordance with configurations of the present disclosure.

FIG. 5 illustrates an example process in accordance with configurations of the present disclosure. This process is illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

At operation 502, one or more processor(s) 312 of the network device 300 may receive, from the UE 200, transmission information, e.g., transmission information 124 as shown in FIG. 1, corresponding to an audio data transmission associated with an audio data packet loss of one or more audio data packets. At operation 504, after the network device 300 receives the transmission information, the one or more processor(s) 312 may determine a geographic region associated with a wireless communication network transceiver, e.g., the network transceiver 110 as shown in FIG. 1. The geographic region may correspond, for example, to one of regions 410-418 as shown in FIG. 4.

At operation 506, the one or more processor(s) 312 may determine, an average audio data packet loss rate associated with the geographic region. At operation 508, the one or more processor(s) 312 may determine a correlation between the audio data packet loss and at least one key performance indicator (KPI). The KPI is indicative of the audio data transmission. At operation 510, the one or more processor(s) 312 may generate a handover instruction comprising at least one threshold value for transitioning control from a first cell channel to a second cell channel. The handover instruction may be generated based at least in part on (i) the average audio data packet loss rate and (ii) the correlation between the audio data packet loss and the at least one KPI.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A processor-implemented method comprising:
receiving, from a mobile device, transmission information corresponding to an audio data transmission associated with an audio data packet loss of one or more audio data packets;
determining at least one network key performance indicator (KPI), the KPI indicative of the audio data transmission; and
generating, based at least in part on (i) an average audio data packet loss rate and (ii) the at least one network KPI, a handover instruction comprising at least one threshold value for transitioning control from a first cell channel to a second cell channel,
wherein the threshold value associated with the handover instruction comprises reference signal received power (RSRP), and
wherein the threshold value associated with the handover instruction is indicative of RSRP for one or more bands comprising a 700 MHz band, a 1900 MHz band, or a 2100 MHz band.

2. The processor-implemented method of claim 1, wherein the threshold value associated with the handover instruction is indicative of a RSRP offset frequency.

3. The processor-implemented method of claim 1, further comprising:
sending the handover instruction to mobile devices associated with a mobile network transceiver.

4. The processor-implemented method of claim 1, further comprising:
determining a correlation between the packet loss of the one or more data packets and the at least one KPI,
wherein the determining comprises:
generating a first correlation value for a first call handling component associated with a first KPI of a plurality of KPIs;
generating a second correlation value for a second call handling component associated with a second KPI of the plurality of KPIs; and
forming a group of KPIs comprising at least the first KPI and the second KPI, and
wherein generating the handover instruction further comprises generating, based at least in part on (i) the average packet loss rate and (ii) the correlation between the transmission information and the at least one KPI, a handover instruction comprising at least one threshold value for transitioning control from a first cell channel to a second cell channel.

5. The processor-implemented method of claim 4, further comprising:
sending the handover instruction to mobile devices associated with a mobile network transceiver.

6. The processor-implemented method of claim 1, further comprising:
generating a graphic output comprising a map of a geographic region associated with the audio data packet loss of the one or more audio data packets, the graphic output generated based at least in part on the average audio data packet loss rate and a count of mobile device audio data transmissions associated with the audio data packet loss of the one or more audio data packets.

7. The processor-implemented method of claim 1, further comprising:
estimating audio quality based at least in part on an audio data packet loss rate.

8. A non-transitory computer-readable storage medium storing computer-executable instructions that, when executed, cause one or more processors of a first device to perform acts comprising:
receiving, from a mobile device, transmission information corresponding to an audio data transmission associated with an audio data packet loss of one or more audio data packets;

determining at least one network key performance indicator (KPI), the KPI indicative of the audio data transmission; and generating, based at least in part on (i) an average audio data packet loss rate and (ii) the at least one KPI, a handover instruction comprising at least one threshold value for transitioning control from a first cell channel to a second cell channel, wherein the threshold value associated with the handover instruction comprises reference signal received power (RSRP), and wherein the threshold value associated with the handover instruction is indicative of RSRP for one or more bands comprising a 700 MHz band, a 1900 MHz band, or a 2100 MHz band.

9. The non-transitory computer-readable storage medium of claim 8, wherein the threshold value associated with the handover instruction is indicative of a RSRP offset frequency.

10. The non-transitory computer-readable storage medium of claim 8, wherein the acts further comprise:
sending the handover instruction to mobile devices associated with a mobile network transceiver.

11. The non-transitory computer-readable storage medium of claim 8, wherein:
the acts further comprise determining a correlation between the packet loss of the one or more data packets and the at least one KPI;
the determining comprises:
generating a first correlation value for a first call handling component associated with a first KPI of a plurality of KPIs;
generating a second correlation value for a second call handling component associated with a second KPI of the plurality of KPIs; and
forming a group of KPIs comprising at least the first KPI and the second KPI; and
generating the handover instruction further comprises generating, based at least in part on (i) the average packet loss rate and (ii) the correlation between the transmission information and the at least one KPI, a handover instruction comprising at least one threshold value for transitioning control from a first cell channel to a second cell channel.

12. The non-transitory computer-readable storage medium of claim 11, wherein the acts further comprise:
sending the handover instruction to mobile devices associated with a mobile network transceiver.

13. The non-transitory computer-readable storage medium of claim 8, wherein the acts further comprise:
generating a graphic output comprising a map of a geographic region associated with the audio data packet loss of the one or more audio data packets, the graphic output generated based at least in part on the average audio data packet loss rate and a count of mobile device audio data transmissions associated with the audio data packet loss of the one or more audio data packets.

14. The non-transitory computer-readable storage medium of claim 8, wherein the acts further comprise:
estimating audio quality based at least in part on an audio data packet loss rate.

15. A system comprising:
one or more processors; and
one or more computer-readable media storing instructions executable by the one or more processors, wherein the instructions, when executed, cause the system to perform operations comprising:
receiving, from a mobile device, transmission information corresponding to an audio data transmission associated with an audio data packet loss of one or more audio data packets;
determining at least one key performance indicator (KPI), the KPI indicative of the audio data transmission; and
generating, based at least in part on (i) an average audio data packet loss rate and (ii) the at least one KPI, a handover instruction comprising at least one threshold value for transitioning control from a first cell channel to a second cell channel,
wherein the threshold value associated with the handover instruction comprises reference signal received power (RSRP), and
wherein the threshold value associated with the handover instruction is indicative of RSRP for one or more bands comprising a 700 MHz band, a 1900 MHz band, or a 2100 MHz band.

16. The system of claim 15, wherein the threshold value associated with the handover instruction is indicative of a RSRP offset frequency.

17. The system of claim 15, wherein the operations further comprise:
sending the handover instruction to mobile devices associated with a mobile network transceiver.

18. The system of claim 15, wherein:
the operations further comprise determining a correlation between the packet loss of the one or more data packets and the at least one KPI;
the determining comprises:
generating a first correlation value for a first call handling component associated with a first KPI of a plurality of KPIs;
generating a second correlation value for a second call handling component associated with a second KPI of the plurality of KPIs; and
forming a group of KPIs comprising at least the first KPI and the second KPI; and
generating the handover instruction further comprises generating, based at least in part on (i) the average packet loss rate and (ii) the correlation between the transmission information and the at least one KPI, a handover instruction comprising at least one threshold value for transitioning control from a first cell channel to a second cell channel.

19. The system of claim 18, wherein the operations further comprise:
sending the handover instruction to mobile devices associated with a mobile network transceiver.

20. The system of claim 15, wherein the operations further comprise:
generating a graphic output comprising a map of a geographic region associated with the audio data packet loss of the one or more audio data packets, the graphic output generated based at least in part on the average audio data packet loss rate and a count of mobile device audio data transmissions associated with the audio data packet loss of the one or more audio data packets.

* * * * *